United States Patent [19]

McGee

[11] Patent Number: 5,506,284
[45] Date of Patent: Apr. 9, 1996

[54] ELECTRODEPOSITION COATING COMPOSITION COMPRISING CROSSLINKED MICROPARTICLES

[75] Inventor: John McGee, Highland, Mich.

[73] Assignee: BASF Corporation, Mount Olive, N.J.

[21] Appl. No.: 23,509

[22] Filed: Feb. 26, 1993

[51] Int. Cl.⁶ ............................................. C25D 13/06
[52] U.S. Cl. ............................ 523/404; 523/410; 523/411; 523/414; 523/415
[58] Field of Search ................................. 523/411, 404, 523/414, 415, 410

[56] References Cited

U.S. PATENT DOCUMENTS

| | | | |
|---|---|---|---|
| 4,496,672 | 1/1985 | Batzill et al. | 523/404 |
| 4,529,754 | 7/1985 | Walther | 523/404 |
| 4,833,208 | 5/1989 | Miyazono et al. | 267/285 |
| 4,975,475 | 12/1990 | Tsuchiya et al. | 523/411 |
| 5,070,120 | 12/1991 | Sakamoto et al. | 523/412 |
| 5,096,556 | 3/1992 | Corrigan et al. | 523/403 |
| 5,185,065 | 2/1993 | Chung et al. | 523/404 |

*Primary Examiner*—Frederick Krass
*Attorney, Agent, or Firm*—Paul L. Marshall

[57] ABSTRACT

An electrodeposition coating composition is described comprising:

(a) an aqueous dispersion of a water-dispersible, electrically-depositable, at least partially neutralized cationic resin, and (b) polymer microparticles, said polymer particles being prepared by:
 (1) blending an acid-neutralized tertiary amino-functional acrylic polymer and a polyepoxide,
 (2) dispersing the blended mixture in an aqueous medium to form a dispersion of microparticles of the blended mixture, and
 (3) heating the dispersion to crosslink the acrylic and polyepoxide in the microparticles.

17 Claims, No Drawings

ELECTRODEPOSITION COATING COMPOSITION COMPRISING CROSSLINKED MICROPARTICLES

FIELD OF THE INVENTION

This invention relates to electrodeposition coating compositions, and in particular to such compositions including crosslinked microparticles.

BACKGROUND OF THE INVENTION

Electrodeposition coating, or electrocoating, is widely used in the art for the application of polymer coatings to metal substrates. Electrodeposition baths usually comprise a principal film-forming resin, such as an acrylic or epoxy resin, with ionic groups that can be salted so that the resin can be dispersed or dissolved in an aqueous bath. Pigments (dispersed in resin pastes), dyes, flow control agents, and other additives are often included in the electrocoat bath.

For automotive or industrial applications where hard electrocoat films are desired, the bath also includes a blocked crosslinking agent that unblocks under appropriate conditions (e.g., with the application of heat) to react with functional groups on the principal resin and thus cure the coating.

One of the advantages of electrodeposition coating compositions and processes is that the coating composition can be applied to a variety of metallic substrates regardless of shape or configuration. This is especially advantageous when the coating is applied as an anticorrosive coating onto a substrate having a number of irregular surfaces, such as a motor vehicle body. In order to maximize an electrodeposition coating's anticorrosion effectiveness, it is important that the coating form a contiguous layer over all portions of the metallic substrate.

Two criteria for measuring the effectiveness of an electrodeposition coating for covering all portions of the substrate are throwpower and edge coverage. Throwpower measures the effectiveness of an electrodeposition coating at covering recessed or interior areas of a metal substrate. Edge coverage measures the effectiveness of an electrodeposition coating at covering the edges of a metallic substrate. Good throwpower and edge coverage are important in order to maximize an electrodeposition coating's anticorrosion effectiveness.

Electrodeposition coatings must often satisfy a number of other criteria as well. A high degree of smoothness is often desirable. For example, when the electrodeposition coating serves as a primer for a high-gloss topcoat, the primer layer must be very smooth in order for the topcoat to have a satisfactory appearance. It is also advantageous to exhibit stability over a range of pH.

It is therefore desirable to provide an electrodeposition coating composition that provides good throwpower and edge coverage, without compromising overal corrosion protection and smoothness.

SUMMARY OF THE INVENTION

According to the present invention, there is provided an electrodeposition coating composition comprising:

(a) an aqueous dispersion of a water-dispersible, electrically-depositable, at least partially neutralized cationic resin, and (b) polymer microparticles, said polymer particles being prepared by:

(1) blending an acid-neutralized tertiary amino-functional acrylic polymer and a polyepoxide, (2) dispersing the blended mixture in an aqueous medium to form a dispersion of microparticles of the blended mixture, and (3) heating the dispersion to crosslink the acrylic and polyepoxide in the microparticles.

When used in an electrodeposition process, the coating composition of the invention provides a smooth, contiguous coating over a variety of portions of the metal substrate, including recessed areas and edges. The coating composition is thus highly effective as an anticorrosive primer coating for metal substrates, particularly for motor vehicle bodies.

DESCRIPTION OF THE PREFERRED EMBODIMENTS

The microparticles used in the practice of the present invention are prepared from a neutralized tertiary amine-functional acrylic polymer and a polyepoxide. The tertiary amine-functional acrylic polymer can be prepared from one or more acrylic monomers containing tertiary amino groups in the ester portion of the molecule and one or more other copolymerizable ethylenically-unsaturated monomers. Tertiary amino group-containing acrylic monomers are well-known in the art and include, for example, dimethylamino ethyl methacrylate and dimethylamino ethyl acrylate. Copolymerizable ethylenically-unsaturated monomers are also well-known in the art. Such monomers preferably do not contain any groups that would be reactive with amine. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as styrene, vinyl toluene, and the like.

Alternatively, the tertiary amine-functional acrylic polymer can be prepared by first forming an acrylic polymer backbone having side groups that can be reacted with another compound so as to attach a tertiary amino group onto the backbone. This can be accomplished, for example, by incorporating glycidyl methacrylate into an acrylic polymer, and then reacting the oxirane side groups with a secondary amine.

The tertiary amine-functional acrylic polymer preferably has a number average molecular weight of from 3000 to 30,000, and more preferably of from 10,000 to 25,000. The polymer preferably has an equivalent weight per tertiary nitrogen of 400 to 1500, and more preferably of 750 to 1200.

Among the polyepoxides that can be used are epoxy condensation polymers (e.g., polyglycidyl ethers of alcohols and phenols), which are preferred, epoxy-containing acrylic polymers, and certain polyepoxide monomers and oligomers.

The epoxy condensation polymers that are used are polyepoxides, that is, those having a 1,2-epoxy equivalency greater than 1, preferably greater than 1 and up to about 3.0. In one preferred embodiment, the polyepoxide is a diepoxide, and thus has a 1,2-epoxy equivalency of 2. Examples of such epoxides are polyglycidyl ethers of polyhydric phenols and of aliphatic alcohols. These polyepoxides can be produced by etherification of the polyhydric phenol or aliphatic alcohol with an epihalohydrin, such as epichlorohydrin, in the presence of alkali.

Examples of suitable polyphenols are 2,2-bis(4-hydroxyphenyl)propane (bisphenol A), 1,1-bis(4-hydroxyphenyl)e- thane, and 2-methyl-1,1-bis(4-hydroxyphenyl)propane. Examples of suitable aliphatic alcohols are ethylene glycol, diethylene glycol, 1,2-propylene glycol, and 1,4-butylene glycol. Also, cycloaliphatic polyols such as 1,2-cyclohexanediol, 1,4-cyclohexanediol, 1,2-bis(hydroxymethyl)cyclohexane, and hydrogenated bisphenol A can also be used.

Besides the epoxy-containing polymers described above, certain polyepoxide monomers and oligomers can also be used. Examples of these materials are those containing the cyclohexane oxide moiety. These polyepoxides are of relatively low molecular weight and of relatively high reactivity, thus enabling the formation of high solids coating compositions with excellent cure response. The polyepoxides should have an average 1,2-epoxy equivalency of greater than one. The preferred polyepoxides are diepoxides, that is, having a 1,2-epoxy equivalency of two.

The epoxy-containing acrylic polymer is a copolymer of an ethylenically unsaturated monomer having at least one epoxy group and at least one polymerizable ethylenically unsaturated monomer that is free of epoxy groups.

Examples of ethylenically unsaturated monomers containing epoxy groups are those containing 1,2-epoxy groups and include glycidyl acrylate, glycidyl methacrylate, and allyl glycidyl ether.

Examples of ethylenically unsaturated monomers that do not contain epoxy groups are alkyl esters of acrylic and methacrylic acid containing from 1 to 20 atoms in the alkyl group. Specific examples of these acrylates and methacrylates are methyl methacrylate, ethyl methacrylate, butyl methacrylate, ethyl acrylate, butyl acrylate, and 2-ethylhexyl acrylate.

Examples of other copolymerizable ethylenically unsaturated monomers are as described above for use with the tertiary amino-functional acrylic polymer, except that acid group-containing copolymerizable ethylenically unsaturated monomers such as acrylic and methacrylic acid are preferably not used because of the possible reactivity of the epoxy and acid group.

The polyepoxide preferably has a number average molecular weight of from 376 to 3000, and more preferably of from 800 to 2000. This can be determined by the GPC method using a polystyrene standard. The polymer preferably has an equivalent weight per epoxy group (i.e., epoxy equivalent weight or EEW) of 188 to 1500, and more preferably of 400 to 1000.

In order to form the microparticles according to the invention, the tertiary amino-functional acrylic polymer is first neutralized with an acid such as acetic acid or lactic acid.

After neutralization, the salted tertiary amino-functional acrylic polymer is blended with the polyepoxide. This blending can be carried out in the presence of polar organic solvent, a mixture of polar organic solvent and water, nonpolar organic solvent, or mixtures thereof. The blending can even be carried out in the absence of any solvent, such as in a mill, however, the blending is preferably carried out in the presence of polar organic solvent or a mixture of polar organic solvent and water (optionally with small amounts of nonpolar organic solvent). Examples of useful solvents for blending the components include butyl Cellosolve®, ethyl Cellosolve®, and ethers of glycols such as ethylene glycol, propylene glycol, or diethylene glycol, and mixtures thereof.

After blending, the mixture of salted tertiary amino-functional acrylic polymer, polyepoxide, and any blending solvent is dispersed in an aqueous medium to form an aqueous dispersion having particle sizes ranging from 0.01 to 10 μm (preferably 0.1 to 0.5 μm), and a nonvolatile content of from 10 to 40% by weight (preferably 20 to 30% by weight). The aqueous medium will contain mainly water, but it may be desirable to add additional polar organic solvent, pH modifiers, surfactants, or dispersants to aid in formation of a dispersion having the desired particle size and uniformity. The use of such solvents, pH modifiers, surfactants, and/or dispersants to form aqueous dispersions is well-known in the art, and does not require a detailed discussion herein.

The above particle size ranges represent preferred ranges for the dispersion of blended polyepoxide and quaternized acrylic as well as for the polymer microparticles. However, it is contemplated that significantly larger particle sizes at the blending stage may also be useful. The reason for this is that during the subsequent crosslinking step, the polyepoxide, which is substantially non-water dispersible, becomes part of a highly-charged water-dispersible crosslink matrix with the quaternized acrylic. Thus, significant reductions in particle size may be obtained during the crosslinking step.

In order to crosslink the blended material contained in each particle of the dispersion, the dispersion is then heated to a temperature of 60° to 98° C. (preferably 78° to 82° C.) for a time sufficient to crosslink the acrylic and the polyepoxide. This crosslinking occurs when the salted tertiary amine and epoxide react and quaternary groups are formed.

The resulting microparticle dispersion can then be incorporated into an electrodeposition coating bath. The microparticles are useful in the bath at levels of 1 to 20%, and preferably 3 to 10%, as a weight percentage of the principal resin nonvolatiles in the electrocoat bath.

The present invention is useful in cathodic electrodeposition coating compositions. Water-dispersible resins usable in the electrodeposition coating process may be classified, depending upon their dispersed state, into the solution type, the dispersion type, the emulsion type, and the suspension type. These types of resins are collectively referred to as "water-dispersible resins" herein. A wide variety of such resins are known and may be used in this invention.

A variety of such resins are known including acrylic, polyester, polyether, phenolic, epoxy, polyurethane, polyamide, polybutadiene, and oil based resins. Typical examples thereof are acrylic copolymers containing acrylic or methacrylic acid esters, maleinized natural and synthetic drying oils, maleinized polybutadiene, half esters and half amides of maleinized oils and polymers.

Water-dispersible resins used in the cathodic electrodeposition coating process have a cationic functional group such as primary, secondary or tertiary amine moiety as a positively chargeable hydrophilic group. A variety of such resins are known including epoxy, polyether, polyester, polyurethane, polyamide, polybutadiene, phenolic and acrylic resins.

Cationic resins have been described in great number in the literature. They typically contain a number of basic groups, such as primary, secondary or tertiary amino groups, so as to provide dispersibility with water. If these resins contain primary and/or secondary amine groups, then they may or may not also contain hydroxyl groups and preferably they do. If only tertiary amino groups are present in the cationic resin, then the resin must contain hydroxyl or other functional groups in order to enable cross-linking. The amino equivalent weight of the cationic resin can range from 150 to 3000, and preferably 500 to 2000. The hydroxyl equivalent weight of the resins, if they have OH groups, is generally between 150 and 1000, and preferably 200 to 500.

In addition, the resins may contain C=C double bonds, the C=C equivalent weight preferably being 500 to 1500.

The molecular weight (mean weight) of a typical cationic resin is usually in the range from 300 to 50,000, and preferably 5000 to 20,000.

Examples of cationic resins are described in the Journal of Coatings Technology, Vol. 54, No. 686, (1982), p. 33–41 ("Polymer Compositions for Cationic Electrodepositable Coatings"), the disclosure of which is incorporated by reference. Polymers of alpha, beta-olefinically unsaturated monomers that contain hydroxyl and/or amino groups may be mentioned here. The hydroxyl or amino groups may be introduced using appropriate monomers in the copolymerization, for example by means of hydroxyl or amino esters of alpha, beta-olefinically unsaturated carboxylic acids, such as hydroxyalkyl (meth)-acrylates or aminoalkyl (meth)acrylates, or by polymeranalogous reaction with diamines or polyamines, for example with N,N-dimethylaminopropylamine, with formation of amide, amino or urethane groups. The polyaminopolyamides, which can be obtained from dimerized fatty acids and polyamines, are a further group. Aminopolyether polyols, which can be prepared by reaction of primary or secondary amines with a polyglycidyl ether, are particularly suited for this. Sufficient epoxide groups to convert all amino groups into tertiary amino groups are advantageously present here. The preferred polyglycidyl ethers are polyglycidyl ethers of bisphenol A and similar polyphenols. They can be prepared, for example by etherifying a polyphenol using an epihalohydrin, such as epichlorohydrin, in the presence of alkali.

The polyglycidyl ethers of the polyphenols may be reacted as such with the amines, but it is frequently advantageous to react some of the reactive epoxide groups with a modified material in order to improve the film properties. The reaction of the epoxide groups with a polyol or a polycarboxylic acid is particularly preferred.

Useful polyols can include polyether polyols, polyester polyols, or urethane polyols. Polyether polyols can be prepared by addition polymerization of alkylene oxides (for example ethylene oxide, propylene oxide, tetrahydrofuran) with low-molecular-weight polyols having 2 to 8 carbon atoms and a molecular weight of about 50 to 300 (for example ethylene glycol, diethylene glycol, propylene glycol, dipropylene glycols, glycerol, trimethylolpropane, 1,2, 6-hexanetriol, pentaerythrite). If ethylene oxide is used alone or in combination with other alkylene oxides as alkylene oxide components, the water-solubility of the resin is improved.

Polyester polyols can be prepared by reaction of the above mentioned low-molecular weight polyols or epoxy compounds, for example fatty acid glycidyl esters, with polycarboxylic acid (for example adipic acid, succinic acid, maleic acid, phthalic acid, or terephthalic acid), or derivatives thereof.

Polyester polyols can be prepared by ring-opening polymerization of a cyclic ester, such as caprolactone or butyrolactone.

Urethane-modified polyols can be obtained by reaction of an excess of the abovementioned polyether polyols or polyester polyols with an organic polyisocyanate.

The above-mentioned polycarboxylic acids are obtained by reaction of the polyols described above with an excess of polycarboxylic acids or, preferably, the anhydrides thereof. They can likewise be obtained by esterification of polycarboxylic acids, or anhydrides thereof, using low-molecular weight polyols, such as ethylene glycol, propylene glycol, etc. Low-molecular weight polyether polyamines or polyamines, such as, for example, hexamethylenediamine, may also be employed in place of the low-molecular weight polyols.

The modification of the aminopolyether polyols using polyols or polycarboxylic acids is preferably carried out before the reaction of the polyglycidyl ethers with the primary or secondary amaines. However, it is also possible to select the ratio of the polyglycidyl ether used as starting material to the amines in such a fashion that an excess of epoxy groups is present. The epoxy groups may then be reacted with the polycarboxylic acids or polyols. It is furthermore possible to further modify the final product, which no longer contains epoxide groups, by reaction of the hydroxyl groups with glycidyl ethers.

According to the curing mechanism of particular resins, they may be classified into three classes. The first one is those capable of self-crosslinking through a radical or oxidative polymerization reaction. The second class of resins requires a crosslinking agent such as blocked polyisocyanates. The third one utilizes both the self-crosslinking reaction and the crosslinking agent in combination.

According to the type of energy source required for initiating the crosslinking reaction, the water-dispersible, chargeable resins may also be classified into the ambient temperature curing or more preferably heat-curing.

The water-dispersible resins useful as principal resins in the present invention are typically hydrophilic such that they are not soluble or dispersible in water when they are in the form of a free base, but become soluble or dispersible to make a stable aqueous solution or dispersion when a sufficient amount (e.g., at least 20%, and more typically 50%) of the base function is neutralized. If the water-dispersible resins are too hydrophilic, they fail to form a coating film having satisfactory water- or corrosion resistance and/or the application of electrodeposition coating processes becomes difficult.

In order to enhance various film properties, the water-dispersible resins are often used in the form of an emulsion in which the water-dispersible resin constitutes a continuous phase, and an optional water-insoluble resin free from chargeable hydrophilic groups (e.g., an epoxy acrylate resin) constitutes a dispersed phase.

When the resin can be crosslinked with a crosslinking agent included in the coating composition for the electrocoat primer layer, any of a number of crosslinking agents or curing agents may be used. Commonly-used crosslinking agents include blocked polyisocyanates including isocyanaurates of polyisocyanates (e.g., hexamethylene diisocyanate) and transesterification crosslinking agents.

In a preferred embodiment of the invention, the crosslinking agent is an aromatic polyisocyanate, including isocyanurates of aromatic polyisocyanates. Useful aromatic polyisocyanates include toluene diisocyanate (TDI), methylene diphenyl diisocyanate (MDI), tetramethylxylene diisocyanate, and the like. In another preferred embodiment, an isocyanurate of an aliphatic polyisocyanate such as hexamethylene diisocyanate is used. These isocyanates are pre-reacted with a blocking agent such an oxime, an alcohol, or an amine, which blocks the isocyanate crosslinking functionality. Upon heating, the blocking agents separate and crosslinking occurs.

The electrodepositable coating compositions of the present invention are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.1 to 10 microns, preferably less than 5 microns. The concentration of the resinous products in the aqueous medium is, in general, not critical, but ordinarily the major portion of the aqueous dispersion is water. The aqueous dispersion usually contains from about 3 to 50 percent preferably 5 to 40 percent by weight resin solids. Aqueous resin concentrates which are to be further diluted with water, generally range from 10 to 30 percent by total weight solids.

The above components are uniformly dispersed in an aqueous medium containing a base in case of the anodic electrodeposition or an acid in case of the cathodic electrodeposition in an amount sufficient to neutralize enough of the ionic groups to impart water-dispersibility to the resin. Examples of bases include ammonia, diethanolamine, triethanolamine, methylethanolamine, diethylamine, morpholine, and potassium hydroxide. Examples of acids include phosphoric acid, acetic acid, propionic acid and lactic acid.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol, ethyl Cellosolve®, propyl Cellosolve®, butyl Cellosolve®, ethylene glycol dimethyl ether, or diacetone alcohol. A small amount of a water-immiscible organic solvent such as xylene, toluene, methyl isobutyl ketone or 2-ethylhexanol may be added to the mixture of water and the water-miscible organic solvent. The amount of coalescing solvent is not unduly critical and is generally between about 0 to 15 percent by weight, preferably about 0.5 to 5 percent by weight based on total weight of the resin solids.

The electrodeposition coating composition used in this invention may further contain conventional pigments such as titanium dioxide, ferric oxide, carbon black, aluminum silicate, precipitated barium sulfate, aluminum phosphomolybdate, strontium chromate, basic lead silicate or lead chromate. The pigment-to-resin weight ratio can be important and should be preferably less than 50:100, more preferably less than 40:100, and usually about 20 to 40:100. Higher pigment-to-resin solids weight ratios have also been found to adversely affect coalescence and flow.

The electrodeposition coating compositions used in the invention can contain optional ingredients such as wetting agents, surfactants, UV absorbers, HALS compounds, antioxidants, defoamers and so forth. Examples of surfactants and wetting agents include alkyl imidazolines such as those available from Ciba-Geigy Industrial Chemicals as Amine C®, acetylenic alcohols available from Air Products and Chemicals as Surfynol® 104. These optional ingredients, when present, constitute from about 0 to 20 percent by weight of resin solids. Plasticizers are optional ingredients because they promote flow. Examples are high boiling water immiscible materials such as ethylene or propylene oxide adducts of nonyl phenols or bisphenol A. Plasticizers can be used and if so are usually used at levels of about 0 to 15 percent by weight resin solids.

Curing catalysts such as tin catalysts are usually present in the coating composition. Examples are dibutyltin dilaurate and dibutyltin oxide. When used, they are typically present in amounts of about 0.05 to 2 percent by weight tin based on weight of total resin solids.

In general, sufficient water is added so that the dispersion has a solids content of more than 20, preferably more than 30% by weight.

The electrodeposition coating composition used in this invention may be applied on a conductive substrate by the electrodeposition coating process at a nonvolatile content of 10 to 25% by weight to a dry film thickness of 10 to 35 μm. After application, the coating may be cured at ambient or an elevated temperature, depending upon the nature of particular base resins.

The electrodeposition of the coating preparations according to the invention may be carried out by any of a number of processes known to those skilled in the art. The deposition may be carried out on all electrically conducting substrates, for example metal, such as steel, copper, aluminum and the like.

According to the invention, a pigmented resin coating and optionally a clearcoat layer is applied over the electrocoat primer layer. In automotive applications, the pigmented resin layer is often called a basecoat or pigmented basecoat. The resin in the pigmented resin layer can be of a number of resins known in the art. For example, the resin can be an acrylic, a polyurethane, or a polyester. Typical pigmented resin coating formulations are described in U.S. Pat. Nos. 4,791,168, 4,414,357, and 4,546,046. The pigmented resin can be cured by any of the known mechanisms and curing agents, such as a melamine polyol reaction (e.g., melamine cure of a hydroxy-functional acrylic resin).

The invention is further described in the following examples.

EXAMPLES

Electrocoat Coating Compositions Preparation for component 1

To a 5 liter round bottom flask equipped with a condenser, Nitrogen flow, and temperature probe, the following materials were added:

997.5 g 2,-4 toluene di-isocyanate (Mondur TD-80®)

To an addition tank the following was added:

828.3 g hexyl Cellosolve®

The hexyl Cellosolve® was added to the flask at a rate in order to maintain an exotherm temperature less than 50° C. The temperature was maintained at 45° C. for an additional hour at which time the following was added:

0.5 g dibutyl tin dilaurate

The following was added at a rate that caused the temperature to rise to and maintain at 115°–120° C.

256.6 g trimethylolpropane

The mixture was maintained at 120° C. for an additional two hours. The mixture was cooled to 110° C. at which time the following was added with continued mixing to cool the resin:

826.1 g methyl isobutyl ketone 90.0 g n-butanol

Preparation for component 2

To a 5 liter round bottom flask equipped with a condenser, Nitrogen flow, and temperature probe, the following materials were added:

1785.6 g Isocyanurate of hexamethylene diisocyanate 33.2 g Methyl Isobutyl Ketone To an addition tank the following materials were added and mixed:

592.1 g 2-ethylhexanol 665.5 g hexyl Cellosolve®

The material from the addition tank was added to the flask over two hours. The temperature climbed to 60° C. and was maintained during the first hour. The temperature increased to 118° C. by the end of the second hour. The batch was maintained at 118° C. for three hours after which the following was added:

33.6 g n-butanol 24.6 g methyl isobutyl ketone

The batch was maintained at 107° C. for 30 minutes at which time the following was added:

210.6 g methyl isobutyl ketone

Preparation for component 3

To a 12 liter round bottom flask equipped with a condenser, nitrogen flow, and temperature probe, the following materials were added:

963.8 g diglycidyl ether of bisphenol A 348.2 g ethoxylate of bisphenol A 73.2 g xylene The mixture was agitated and heated to 120° C. and vacuum distilled into a Dean Stark trap to remove any water. The following was added and the mixture was heated to 135° C.

280.1 g bisphenol A 2.2 g benzyl dimethyl amine

The mixture exothermed to 172° C. and was cooled to and maintained at 143° C. for two hours from the point of peak temperature. The following was added:

2.6 g benzyl dimethyl amine

The epoxy concentration was titrated at thirty minute intervals to an endpoint of 1200 g. N.V. resin/eq. epoxide at which point the following was added:

1386.5 g component #1

At 105° C., the following was added in the order listed:

107.0 g ketimine of diethylene triamine (70% solution)

4.6 g phenyl ether of propylene glycol 74.0 g methyl ethanol amine

The mixture exothermed to 118° C. and was maintained at that temperature for one hour. The resin was cooled to 90° C. with the addition of the following:

293.7 g component #2

Once homogeneous, the following was added in the order listed with increased mixing:

98.0 g lactic acid 85%

40.6 g Surfynol® 104 (50% solution)

Once homogeneous, the following was added over 15 minutes:

3113.1 g deionized water

Once homogeneous, the following was added:

408.0 g deionized water

Once homogeneous, the following was added:

266.0 g deionized water

Once homogeneous, the following was added:

266.0 g deionized water

Once homogeneous, the following was added:

266.0 g deionized water

The emulsion was stirred in an open container for 3.5 weeks to allow evaporation of low boiling solvents. Evaporation loss was replenished daily with distilled water during this period.

Preparation for component 4

To a 5 liter round bottom flask equipped with a condenser, nitrogen flow, and temperature probe, the following materials were added:

1606.0 g 2,4-toluene diisocyanate 129.2 g methyl isobutyl ketone

To an addition tank the following was added:

1231.9 g 2-ethylhexanol

The alcohol was added to the flask at a rate such that the temperature was maintained between 40°–43° C. Once the addition was complete the temperature was maintained at 43° C. for two hours after which the following was added:

32.3 g methyl isobutyl ketone

Preparation for component 5

To a 5 liter round bottom flask equipped with a condenser, Nitrogen flow, and temperature probe, the following materials were added:

397.8 g methyl ethanol amine

The following was added over 4.5 hours:

1463.9 g component #4

The temperature rose to and was maintained between 73°–76° C. during this addition. The temperature was maintained an additional 30 minutes at 77° C. at which time the following was added:

178.8 g butyl Cellosolve®

After an additional 20 minutes the following was added:

536.3 g lactic acid (85%)

423.1 g deionized water

The mixture was maintained 2.5 hours at 91° C.

Preparation for component 6

To a 5 liter round bottom flask equipped with a condenser, nitrogen flow, and temperature probe, the following materials were added:

639.3 g diglycidyl ether of bisphenol A 260.7 g bisphenol A

The batch was heated to 110° C. at which time the following was added:

0.2g triphenyl phosphine 1.0g xylene

The mixture exothermed to and was maintained at 180° C. for 30 minutes then cooled to 175° C. The following was added after which the temperature was maintained for one hour.

0.2 g triphenyl phosphine 1.0 g xylene

The batch was cooled to 132° C. at which time the following was added:

371.4 g component #4

3.2 g xylene

The batch was maintained at 124° C. for two hours after which the following was added:

1070.0 g butyl Cellosolve®

The mixture was cooled to 82° C. at which time the following was added:

517.2 g component #5

136.0 g butyl Cellosolve®

The mixture was maintained for five hours at 82° C. to complete the synthesis.

Preparation for component 7

In a stainless steel ½ gallon vessel, the following were added and mixed with a high speed cowles blade for 15 minutes:

523.0 g deionized water 374.6 g component #6

7.7 g anti-crater additive

After a homogeneous state was obtained, the following components were added in the order listed:

25.3 g carbon black 43.4 g dibutyl tin oxide 50.7 g lead silicate 18.1 g clay extender 839.6 g TiO2

117.6 g deionized water

The material was mixed for one hour followed by milling on a small media mill to a fineness of grind of 11 μm.

Preparation for component 8

To a 5 liter round bottom flask equipped with a condenser, nitrogen flow, and temperature probe, the following materials were added:

1142.5 g methylene diphenyl diisocyanate 2.0 g dibutyl tin diluarate

The mixture was heated to 40° C. at which time the following was added over two hours.

525.5 g diethylene glycol butyl ether 337.4 g ethylene glycol propyl ether

The temperature increased to and was maintained at 57°–60° C. until one hour following the end of the addition. The mixture was diluted with the following:

782.6 g methyl isobutyl ketone 2.1 g dibutyl tin diluarate

The following was added over 30 minutes:

94.6 g trimethylol propane

The temperature was allowed to exotherm to and was maintained at 77° C. during this addition. The temperature was maintained at 87° C. for 4 additional hours. The following was added after which the temperature was maintained one hour at 85° C.

83.4 g n-butanol 30.0 g methyl isobutyl ketone

Preparation for component 9

To a 3 liter round bottom flask equipped with a condenser, nitrogen flow, and temperature probe, the following materials were added:

967.4 g isocyanurate of hexamethylene diisocyanate (Desmodur N3300®)

387.4 g methyl isobutyl ketone

The following was added from an addition tank at a rate such that the temperature of the mixture was maintained at 60° C.:

616.0 g dibutyl amine

The temperature was maintained for 30 minutes after which the following addition was made:

0.4 g dibutyl tin dilaurate 28.6 g n-butanol

The mixture was heated to 75° C. for 1 hour at which time no free isocyanate was observed by infra-red spectroscopy.

Preparation for component 10

To a 12 liter round bottom flask equipped with a condenser, Nitrogen flow, and temperature probe, the following materials were added:

1095.1 g diglycidyl ether of bisphenol A 249.0 g bisphenol A 238.9 g dodecylphenol 79.4 g xylene The mixture was heated with stirring to 120° C. and vacuum distilled by vacuum into a Dean Stark trap to remove any moisture. After heating to 125° C., the following addition was made:

3.1 g benzyl dimethyl amine

After exotherming to 152° C., the mixture cooled to 140° C. at which time the following was added:

1.7g benzyl dimethyl amine

The mixture was maintained at 130° C. and titrated for epoxy content at 30 minute intervals to an endpoint of 870 g N.V>resin/eq. epoxide. At this point the following was added:

34.7 g butyl Cellosolve®

182.3 g sec-butanol 124.3 g diethanol amine

The mixture was cooled to 90° C. over a one hour period at which time the following was added:

177.7 g ethoxylated phenolic plasticizer 128.2 g sec-butanol 48.7 g propylene glycol phenyl ether The mixture was further cooled to 65° C. over 35 minutes at which time the following was added:

34.8 g dimethyl amino propyl amine

The mixture was maintained 30 minutes at 65° C. then heated to 90° C. and maintained for one hour. The mixture was cooled to 68° C. and blended with the following until homogeneous:

740.3 g component 8

647.7 g component 9

8.9g anti-crater additive

The following was added in order and vigorously mixed:

105.0 g lactic acid (88%)

2034.0 g deionized water

Once homogeneous, the mixture was reduced with the addition of the following over a 90 minute period with continued agitation:

3060.2 g deionized water

The above emulsion was split into portions and heated to 50° C. and vacuum distilled to remove low boiling solvents. Distillation was continued until a concentration of sec-butanol <0.5% was achieved. All condensate removed in the process were replenished with deionized water.

Preparation for component 11

To a 12 liter round bottom flask equipped with a condenser, Nitrogen flow, and temperature probe, the following materials were added:

2343.6 g diglycidyl ether of bisphenol A
408.2 g Dodecylphenol
710.6 g bisphenol A
178.8 g xylene The components were heated with mixing to 120° C. at which time the following was added:

3.4 g triphenyl phosphine

The mixture exothermed to a peak temperature of 176° C. after which the temperature was maintained at 150° C. for one hour. At this time the following was added:

2103.6 g diepoxide of polypropylene oxide (EEW=378 g/eq.)
876.8 g butyl Cellosolve®

The mixture was cooled to 78° C. at which time the following was added:

240.0 g amino ethoxy ethanol

The mixture exothermed to 97° C. over 30 minutes at which time the following was added:

190.6 g dimethylaminopropylamine

The mixture exothermed to 120° C. over 15 minutes after which the temperature was held at 110° C. for four hours. After cooling the mixture to 100° C. the following was added.

1012.4 g butyl Cellosolve®

Once homogeneous, the following was added over 25 minutes:

187.3 g glacial acetic acid
1164.8 g deionized water

After one hour mixing, the material was transferred to a 5 gallon plastic pail. The following was added to the empty flask and heated to 60° C. with mixing to recover residual material.

499.9 g butyl Cellosolve®
78.4 g deionized water

Once adequately solved in the wash solution, the solution was added with mixing to the plastic pail.

Preparation for component 12

In a stainless steel ½ gallon vessel, the following were added and mixed thoroughly on order listed with a high speed cowles blade for 15 minutes:

307.1 g component 11
4.3 g coalescing aid
332.2 g deionized water

After a homogeneous state was obtained, the following components were added in the order listed:

8.4 g carbon black
83.7 g deionized water
43.3 g metal oxide white pigment
55.7 g clay extender
527.6 g metal oxide white pigment
37.7 g dibutyl tin oxide
28.0 g deionized water The material was mixed for one hour followed by milling on a small media mill to a fineness of grind of 10 microns.

Preparation for component 13

To a 5 liter round bottom flask equipped with mixing paddle, condenser and temperature probe, the following materials were added under nitrogen atmosphere:

458.5 g butyl Cellosolve®
65.4 g deionized water

To an addition tank the following materials were added and mixed:

439.7 g styrene
401.4 g n-butyl acrylate
415.4 g hydroxy ethyl acrylate
243.4 g dimethylamino ethyl methacrylate
24.1 g 2,2-azobis(2-methylbutane nitrile) dissolved in 72.3 g methyl isobutyl ketone The flask was heated to reflux at 103° C. at which time the nitrogen flow was discontinued. The mixture in the addition tank was added at a constant rate over two hours. The following solvent was introduced to the flask after flushing the pump and lines. Reflux was maintained for an additional 1.25 hours.

100.0 g butyl Cellosolve®

The following initiator solution was introduced over 20 minutes:

6.6 g 2,2-azobis(2-methylbutane nitrile) dissolved in 20.0 g methyl isobutyl ketone Reflux was maintained for 2 additional hours at 105°–110° C. The resin was cooled to 50° C. and blended with the following:

92.9 g glacial acetic acid

Preparation for component 14

To a 3 liter round bottom flask equipped with mixing paddle, condenser and temperature probe, the following materials were added under Nitrogen atmosphere:

1151.0 g diglycidyl ether of bisphenol A
348.8 g bisphenol A
78.7 g xylene

The mixture was heated to 110° C. at which time the following was added:

0.8 g triphenyl phosphine

Heat was discontinued at 135° C. at which point an exotherm was noted. The temperature was allowed to climb to 164° C. after which it dropped to and was maintained at 150° C. for a period of one hour from the point of peak exotherm temperature. The resin was cooled to 130° C. at which time the following was added:

420.4 g butyl Cellosolve®

Preparation for microparticle dispersion 15

To a 1 liter round bottom flask equipped with mixing paddle, condenser and temperature probe, the following materials were added:

217.9 g component 13
78.5 g component 14

The components were mixed until homogeneous. This mixture was dispersed with agitation during the addition of the following over a 15 minute period:

544.3 g deionized water

The dispersion was heated to 80° C. and maintained at that temperature for 4.5 hours with continued mixing.

Preparation for component 16

To a 5 liter round bottom flask equipped with mixing paddle, condenser and temperature probe, the following materials were added under nitrogen atmosphere:

458.5 g butyl Cellosolve®

65.4 g deionized water

To an addition tank the following materials were added and mixed:

423.5 g styrene 385.2 g n-butyl acrylate 399.2 g hydroxy ethyl acrylate 292.1 g dimethylamino ethyl methacrylate 33.1 g 2,2-azobis(2-methylbutane nitrile) dissolved in 72.3 g methyl isobutyl ketone The flask was heated to reflux at 103° C. at which time the nitrogen flow was discontinued. The mixture in the addition tank was added at a constant rate over two hours. The following solvent was introduced to the flask after flushing the pump and lines. Reflux was maintained for an additional 1.25 hours.

75.0 g butyl Cellosolve®

The following initiator solution was introduced over 20 minutes:

6.6g 2,2-azobis(2-methylbutane nitrile) dissolved in 20.0 g methyl isobutyl ketone Reflux was maintained for 2 additional hours at 105°–110° C. The resin was cooled to 50° C. and blended with the following:

111.6 g glacial acetic acid

Preparation for component 17

To a 1 liter round bottom flask equipped with mixing paddle, condenser and temperature probe, the following materials were added under nitrogen atmosphere:

346.7 g diglycidyl ether of bisphenol A 153.2 g bisphenol A 26.3 g xylene

The mixture was heated to 110° C. at which time the following was added:

0.3 g triphenyl phosphine

Heat was discontinued at 135° C. at which point an exotherm was noted. The temperature was allowed to climb to 164° C. after which it dropped to and was maintained at 150° C. for a period of one hour from the point of peak exotherm temperature. The resin was cooled to 130° C. at which time the following was added:

191.0 g butyl Cellosolve®

Preparation for microparticle dispersion 18

To a 5 liter round bottom flask equipped with mixing paddle, condenser and temperature probe, the following materials were added:

545.5 g component 16

499.4 g component 17

The components were mixed until homogeneous. This mixture was dispersed with agitation during the addition of the following over a 15 minute period:

2471.1 g deionized water

The dispersion was heated to 80° C. and maintained at that temperature for 4.5 hours with continued mixing.

Preparation for microparticle dispersion 19

To a 5 liter round bottom flask equipped with mixing paddle, condenser and temperature probe, the following materials were added:

463.1 g component 16

199.5 g component 14

200.9 g component 1

The components were mixed until homogeneous. This mixture was dispersed with agitation during the addition of the following over a 15 minute period:

2136.0 g deionized water

The dispersion was heated to 80° C. and maintained at that temperature for 4.5 hours with continued mixing.

Preparation for microparticle dispsersion 20

To a 5 liter round bottom flask equipped with mixing paddle, condenser and temperature probe, the following materials were added:

463.1 g component 16

199.5 g component 14

185.2 g component 9

The components were mixed until homogeneous. This mixture was dispersed with agitation during the addition of the following over a 15 minute period:

2152.0 g deionized water

The dispersion was heated to 80° C. and maintained at that temperature for 4.5 hours with continued mixing.

The characteristics of the microparticle dispersions 15, 18, 19, and 20 are set forth below in Table 1.

TABLE 1

| | Disp. #15 | Disp.#18 | Disp.#19 | Disp.#20 |
|---|---|---|---|---|
| Acrylic Block | | | | |
| Wt % Styrene | 29.3 | 28.2 | 28.2 | 28.2 |
| Wt % n-BA | 26.8 | 25.7 | 25.7 | 25.7 |
| Wt % HEA | 27.7 | 26.6 | 26.6 | 26.6 |
| Wt % DMAENA | 16.2 | 19.5 | 19.5 | 19. |
| Wt % VAZO 67 ® | 2 | 2.6 | 2.6 | 2.6 |
| Wt/amine Epoxy Block | 978 g/eq. | 1817 g/eq. | 1817 g/eq. | 817 g/eq. |
| Wt./epoxy Stoichiometry | 503 g/eq. | 1995 g/eq. | 503 g/eq. | 503 g/eq. |
| eq.'s 3° amine | 1 | 1 | 1 | 1 |
| eq.'s HOAc | 1 | 1 | 1 | 1 |
| eq.'s epoxide Final Dispersion | 0.81 | 0.81 | 0.81 | 0.81 |
| Rxn % completion | 94.7 | 81.1 | 80.9 | 77.4 |
| % N.V. | 20.53 | 20.79 | 20.62 | 20.57 |

TABLE 1-continued

|  | Disp. #15 | Disp.#18 | Disp.#19 | Disp.#20 |
|---|---|---|---|---|
| p.s. (nm) | 201 | 430 | 197 | 187 |
| Mw | gel | gel | gel | gel |
| Wt % Acrylic | 70 | 50.3 | 50.1 | 50.1 |
| Wt % Epoxy | 30 | 49.7 | 24.9 | 24.9 |
| Wt % Crosslinker | 0 | 0 | 25 | 25 |
| Wt./quat | 1709 g/eq | 2003 g/eq | 2019 g/eq | 2019 g/eq |

Preparation for Electrodeposition Bath 21 (Comparison)

An electrodeposition bath was prepared in a 1 gallon plastic pail from the following:

2225 g Component #3
170 g Component #7
2005 g Deionized water

Preparation for Electrodeposition Bath 22 (Invention)

An electrodeposition bath was prepared in a 1 gallon plastic pail from the following:

2090 g Component #3
226 g Component #19
170 g Component #7
1913 g Deionized water

Preparation for Electrodeposition Bath 23 (Invention)

An electrodeposition bath was prepared in a 1 gallon plastic pail from the following:

2090 g Component #3
227 g Component #20
170 g Component #7
1912 g Deionized water

Preparation for Electrodeposition Bath 24 (Comparison)

An electrodeposition bath was prepared in a 1 gallon plastic pail from the following:

2298 g Component #10
386 g Component #12
1716 g Deionized water

Preparation for Electrodeposition Bath 25 (Invention)

An electrodeposition bath was prepared in a 1 gallon plastic pail from the following:

2160 g Component #10
207 g Component #18
386 g Component #12
1646 g Deionized water

Procedure 1

Electrodeposition baths #24 and #25 were aged and ultrafiltered to a conductivity of 1400 micro mhos. Bare cold rolled steel and phosphated cold rolled steel panels were coated from each bath at a film build of 0.9 mils.

Ford throwpower boxes were constructed from phosphated cold rolled steel and coated at 275V to a build of 0.5 mils from electrodeposition baths #21, #22, and #23. The total distance of painted substrate was measured for each bath. Significant improvements in throwing potential are achieved through incorporation of additives such as microparticle dispersions #19 and #20.

The invention has been described in detail with reference to preferred embodiments thereof. It should be understood, however, that variations and modifications can be made within the spirit and scope of the invention.

What is claimed is:

1. An electrodeposition coating composition comprising:
   (a) an aqueous dispersion of a water-dispersible, electrically-depositable, film-forming, at least partially neutralized cationic resin, and
   (b) crosslinked polymer microparticles, said polymer microparticles being prepared by:
      (1) blending an acid-neutralized tertiary amino-functional acrylic polymer and a polyepoxide to form a blended mixture,
      (2) dispersing the blended mixture in an aqueous medium to form a dispersion of microparticles of the blended mixture, and
      (3) heating the dispersion to react the acid-neutralized tertiary amino functional groups of said acrylic polymer with the polyepoxide, thereby crosslinking the acrylic polymer and polyepoxide in the microparticles.

2. An electrodeposition coating composition according to claim 1 wherein the polymer microparticles have a particle size of from 0.01 to 10 µm.

3. An electrodeposition coating composition according to claim 1 wherein the polymer microparticles have a particle size of from 0.1 to 0.5 µm.

4. An electrodeposition coating composition according to claim 1 comprising from 1 to 20% by weight of said polymer microparticles, based on the weight of said resin (a).

5. An electrodeposition coating composition according to claim 1 wherein the acrylic polymer has a number average molecular weight of from 3000 to 30,000.

6. An electrodeposition coating composition according to claim 1 wherein the acrylic polymer has a number average molecular weight of from 10,000 to 25,000.

7. An electrodeposition coating composition according to claim 1 wherein the acrylic polymer has an equivalent weight per tertiary nitrogen of 400 to 1500.

8. An electrodeposition coating composition according to claim 1 wherein the acrylic polymer has an equivalent weight per tertiary nitrogen of 750 to 1200.

9. An electrodeposition coating composition according to claim 1 wherein the polyepoxide is a diepoxide.

10. An electrodeposition coating composition according to claim 1 wherein the polyepoxide has an equivalent weight per epoxy group of 188 to 1500.

11. An electrodeposition coating composition according to claim 1 wherein the polyepoxide has an equivalent weight per epoxy group of 400 to 1000.

12. An electrodeposition coating composition according to claim 1 wherein said blended mixture further comprises a blocked polyisocyanate crosslinking agent.

13. An electrodeposition coating composition according to claim 1 wherein said blending step comprises blending the acid-neutralized tertiary amino-functional acrylic polymer and a polyepoxide in the presence of a polar organic solvent.

14. An electrodeposition coating composition according to claim 1 wherein said blending step comprises blending the acid-neutralized tertiary amino-functional acrylic polymer and a polyepoxide in the presence of a mixture of a polar organic solvent and water.

15. An electrodeposition coating composition according to claim 1 wherein said dispersion of microparticles in aqueous medium has a nonvolatiles content of 10 to 40 weight %.

16. An electrodeposition coating composition according to claim 1 wherein said dispersion of microparticles in aqueous medium has a nonvolatiles content of 20 to 30 weight %.

17. An electrodeposition coating composition according to claim 1 wherein the tertiary amino-functional acrylic polymer is prepared from one or more acrylic monomers containing tertiary amino groups.

* * * * *